US012574932B2

(12) United States Patent
Sambhwani et al.

(10) Patent No.: US 12,574,932 B2
(45) Date of Patent: Mar. 10, 2026

(54) TRANSMISSION PADDING EFFICIENCY IMPROVEMENT

(71) Applicant: Apple Inc., Cupertino, CA (US)

(72) Inventors: Sharad Sambhwani, San Diego, CA (US); Dirk Nickisch, Oberpframmern (DE); Madhukar K. Shanbhag, Santa Clara, CA (US); Sanjeevi Balasubramanian, San Jose, CA (US); Shiva Krishna Narra, San Jose, CA (US); Sriram Subramanian, San Jose, CA (US); Vishwanth Kamala Govindaraju, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 710 days.

(21) Appl. No.: 17/811,443

(22) Filed: Jul. 8, 2022

(65) Prior Publication Data

US 2023/0014946 A1 Jan. 19, 2023

Related U.S. Application Data

(60) Provisional application No. 63/221,407, filed on Jul. 13, 2021.

(51) Int. Cl.
| | |
|---|---|
| *H04W 72/23* | (2023.01) |
| *H04L 1/00* | (2006.01) |
| *H04W 72/21* | (2023.01) |
| *H04W 72/54* | (2023.01) |

(52) U.S. Cl.
CPC .......... *H04W 72/23* (2023.01); *H04L 1/0008* (2013.01); *H04W 72/21* (2023.01); *H04W 72/54* (2023.01)

(58) Field of Classification Search
CPC ..... H04W 72/23; H04W 72/21; H04W 72/54; H04W 28/082; H04W 76/15; H04W 28/0278; H04L 1/0008; H04L 47/83
See application file for complete search history.

(56) References Cited

U.S. PATENT DOCUMENTS

| | | | |
|---|---|---|---|
| 7,187,669 B1 * | 3/2007 | Lee ..................... | H04L 12/2861 370/347 |
| 10,085,213 B1 * | 9/2018 | Nimmala .......... | H04W 52/0261 |
| 2011/0310833 A1 * | 12/2011 | Lee ..................... | H04W 74/002 370/329 |

(Continued)

FOREIGN PATENT DOCUMENTS

| | | |
|---|---|---|
| CN | 104113925 | 10/2014 |
| CN | 112738891 | 4/2021 |
| WO | 2010/059087 | 5/2010 |

OTHER PUBLICATIONS

Ericsson, "UL Split in Dual Connectivity", 3GPP TSG RAN WG2 #97bis, R2-1702749, Apr. 3, 2017, 4 sheets.

*Primary Examiner* — Ayaz R Sheikh
*Assistant Examiner* — Tarell A Hampton
(74) *Attorney, Agent, or Firm* — Fay Kaplun & Marcin, LLP

(57) ABSTRACT

A user equipment (UE) configured to receive an uplink (UL) grant comprising a UL grant size, determine a current UL buffer size, compare the current UL buffer size to the UL grant size and determining an amount of padding to fill the UL grant and determine whether to transmit on the UL grant based on the amount of padding to fill the UL grant.

20 Claims, 6 Drawing Sheets

(56) References Cited

U.S. PATENT DOCUMENTS

| | | | | |
|---|---|---|---|---|
| 2012/0039263 | A1* | 2/2012 | Moberg | H04W 72/21 |
| | | | | 370/329 |
| 2013/0301568 | A1* | 11/2013 | Park | H04W 72/04 |
| | | | | 370/329 |
| 2015/0201360 | A1* | 7/2015 | Ray Chaudhuri | H04W 36/302 |
| | | | | 455/436 |
| 2015/0245345 | A1* | 8/2015 | Gao | H04L 1/1861 |
| | | | | 370/329 |
| 2015/0282158 | A1* | 10/2015 | Chen | H04L 5/0044 |
| | | | | 370/329 |
| 2016/0088534 | A1* | 3/2016 | Axmon | H04L 5/0055 |
| | | | | 370/252 |
| 2016/0112178 | A1* | 4/2016 | Yi | H04W 72/23 |
| | | | | 370/280 |
| 2016/0338041 | A1* | 11/2016 | Li | H04W 52/143 |
| 2017/0208443 | A1* | 7/2017 | Gupta | H04W 76/16 |
| 2017/0208590 | A1* | 7/2017 | Kim | H04W 72/0453 |
| 2018/0103485 | A1* | 4/2018 | Jiang | H04W 72/1268 |
| 2018/0139699 | A1* | 5/2018 | Choi | H04W 52/0216 |
| 2018/0270847 | A1* | 9/2018 | Takeda | H04L 5/0057 |
| 2018/0279293 | A1* | 9/2018 | Harrison | H04B 7/0639 |
| 2019/0045534 | A1* | 2/2019 | Zaks | H04W 72/23 |
| 2019/0082436 | A1* | 3/2019 | Huang | H04W 28/18 |
| 2019/0159260 | A1* | 5/2019 | Charbit | H04L 1/0075 |
| 2019/0306877 | A1* | 10/2019 | Wang | H04L 5/0087 |
| 2019/0320467 | A1* | 10/2019 | Freda | H04W 74/004 |
| 2019/0364605 | A1* | 11/2019 | Loehr | H04W 72/56 |
| 2020/0112415 | A1* | 4/2020 | Huang | H04L 5/0044 |
| 2020/0137777 | A1* | 4/2020 | Rosa | H04W 72/23 |
| 2020/0344818 | A1* | 10/2020 | Höglund | H04W 74/004 |
| 2020/0374934 | A1* | 11/2020 | Koskinen | H04W 76/25 |
| 2021/0099977 | A1 | 4/2021 | Dalmiya et al. | |
| 2021/0160931 | A1* | 5/2021 | Shi | H04W 72/21 |
| 2021/0195629 | A1* | 6/2021 | Chauvin | H04L 1/0009 |
| 2021/0266105 | A1* | 8/2021 | Lei | H04L 1/1614 |
| 2022/0264604 | A1* | 8/2022 | Fröberg Olsson | H04W 72/56 |
| 2022/0345252 | A1* | 10/2022 | Loehr | H04L 1/1874 |
| 2023/0198593 | A1* | 6/2023 | Zhang | H04L 5/0057 |
| | | | | 370/329 |
| 2023/0239730 | A1* | 7/2023 | Esswie | H04W 56/00 |
| | | | | 370/328 |
| 2023/0269696 | A1* | 8/2023 | Lee | H04W 24/10 |
| | | | | 455/456.1 |

* cited by examiner

Method 400

Method 500

Method 600

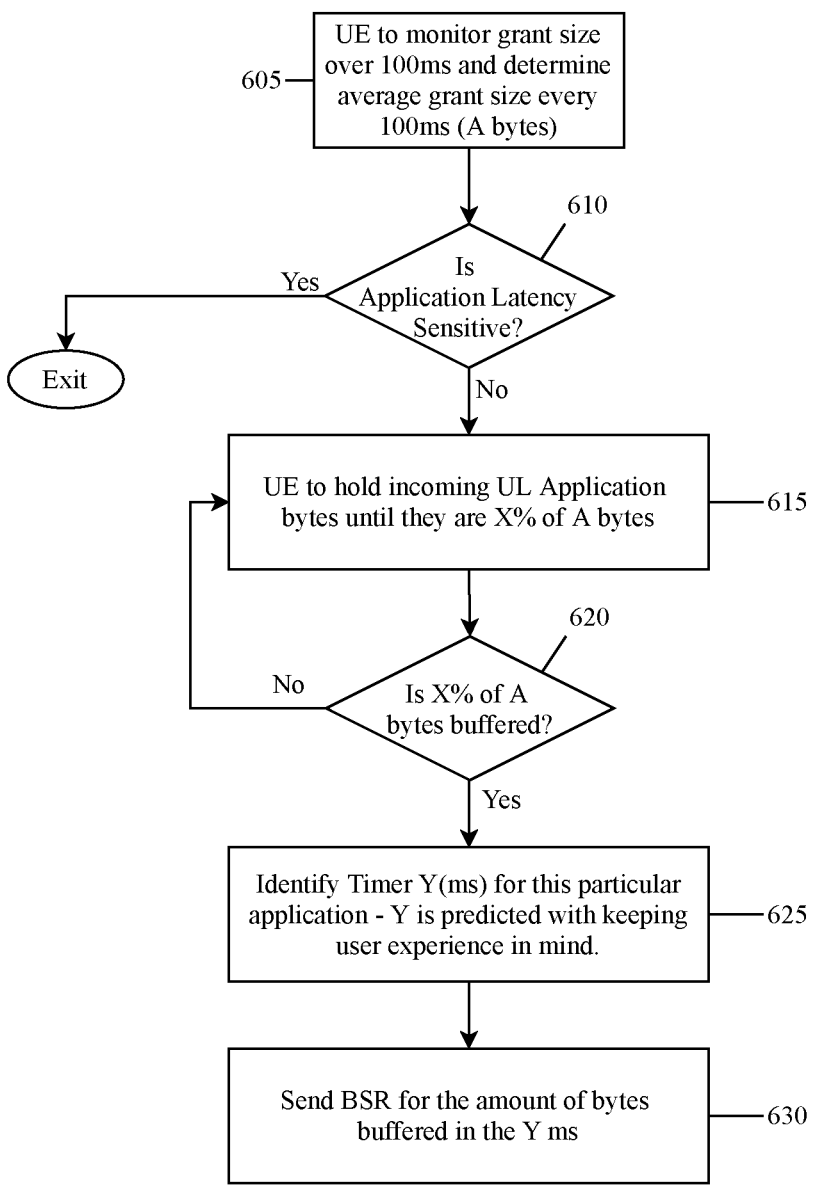

605 — UE to monitor grant size over 100ms and determine average grant size every 100ms (A bytes)

610

Is Application Latency Sensitive?

Yes → Exit

No

UE to hold incoming UL Application bytes until they are X% of A bytes —615

620

Is X% of A bytes buffered?

No

Yes

Identify Timer Y(ms) for this particular application - Y is predicted with keeping user experience in mind. —625

Send BSR for the amount of bytes buffered in the Y ms —630

Fig. 6

TRANSMISSION PADDING EFFICIENCY IMPROVEMENT

PRIORITY CLAIM/INCORPORATION BY REFERENCE

This application claims priority to U.S. Provisional Application Ser. No. 63/221,407 filed on Jul. 13, 2021 and entitled, "Transmission Padding Efficiency Improvement," the entirety of which is incorporated by reference herein.

BACKGROUND

A user equipment (UE) may establish a connection to at least one of a plurality of different networks or types of networks, for example a 5G New Radio (NR) radio access technology (RAT) and a Long-Term Evolution (LTE) RAT. The UE may support standalone (SA) carrier aggregation (CA) on LTE, SA CA on NR (NR-CA), or a variety of non-standalone (NSA) and/or dual-connectivity (DC) functionalities in which a plurality of component carriers (CCs) are combined across LTE and NR. Each CC may represent a channel that facilitates communication between the UE and the network over a particular frequency band. A plurality of CCs configured for the UE may correspond to the same frequency band, each CC may correspond to a different frequency band, or a combination of CCs across the same frequency band and CCs across different frequency bands may be used.

When the UE is configured with a primary radio link and a secondary radio link in a DC configuration, the UE transmits uplink (UL) data on either the primary link, the secondary link, or both links based on an RRC configuration and a data volume in the UL data buffer. The network(s) predict the required UL grant size for the UE based on buffer status reports (BSR) that are sent by the UE. However, the network typically provides a larger UL grant than is required to empty the UL data buffer. When this occurs, the UE is then required to fill the remaining portion of the grant by adding padding, e.g., transmitting dummy bytes to fill the grant. This behavior may cause the UE to transmit with a high transmission (Tx) duty cycle, resulting in unnecessary power consumption and increased radio frequency (RF) exposure, which may cause the UE to reduce Tx power or future Tx duty cycles and reduce the UL coverage of the UE.

SUMMARY

Some exemplary embodiments are related to a processor of a user equipment (UE) configured to perform operations. The operations include receiving an uplink (UL) grant comprising a UL grant size, determining a current UL buffer size, comparing the current UL buffer size to the UL grant size and determining an amount of padding to fill the UL grant and determining whether to transmit on the UL grant based on the amount of padding to fill the UL grant.

Other exemplary embodiments are related to a processor of a user equipment (UE) configured to perform operations. The operations include adding first uplink (UL) data to a first buffer when the first UL data is determined to be non-time-sensitive, receiving an UL grant comprising a UL grant size, determining an excess amount of the UL grant relative to second UL data to be transmitted, filling some or all of the excess UL grant with the first UL data and performing a UL transmission comprising the first UL data and the second UL data.

Still further exemplary embodiments are related to a processor of a user equipment (UE) configured to perform operations. The operations include monitoring uplink (UL) grant behavior of a network and determining an average UL grant size, determining a maximum allowable latency for transmission of UL data submitted by an application of the UE, storing the UL data submitted by the application in a buffer and transmitting a buffer status report when the UL data stored in the buffer exceeds a predetermined threshold relative to the average UL grant size or when the maximum allowable latency for the UL data is reached.

BRIEF DESCRIPTION OF THE DRAWINGS

FIG. 6 shows an exemplary method for intelligent triggering of buffer status reporting (BSR) according to various exemplary embodiments.

DETAILED DESCRIPTION

Figure 1:
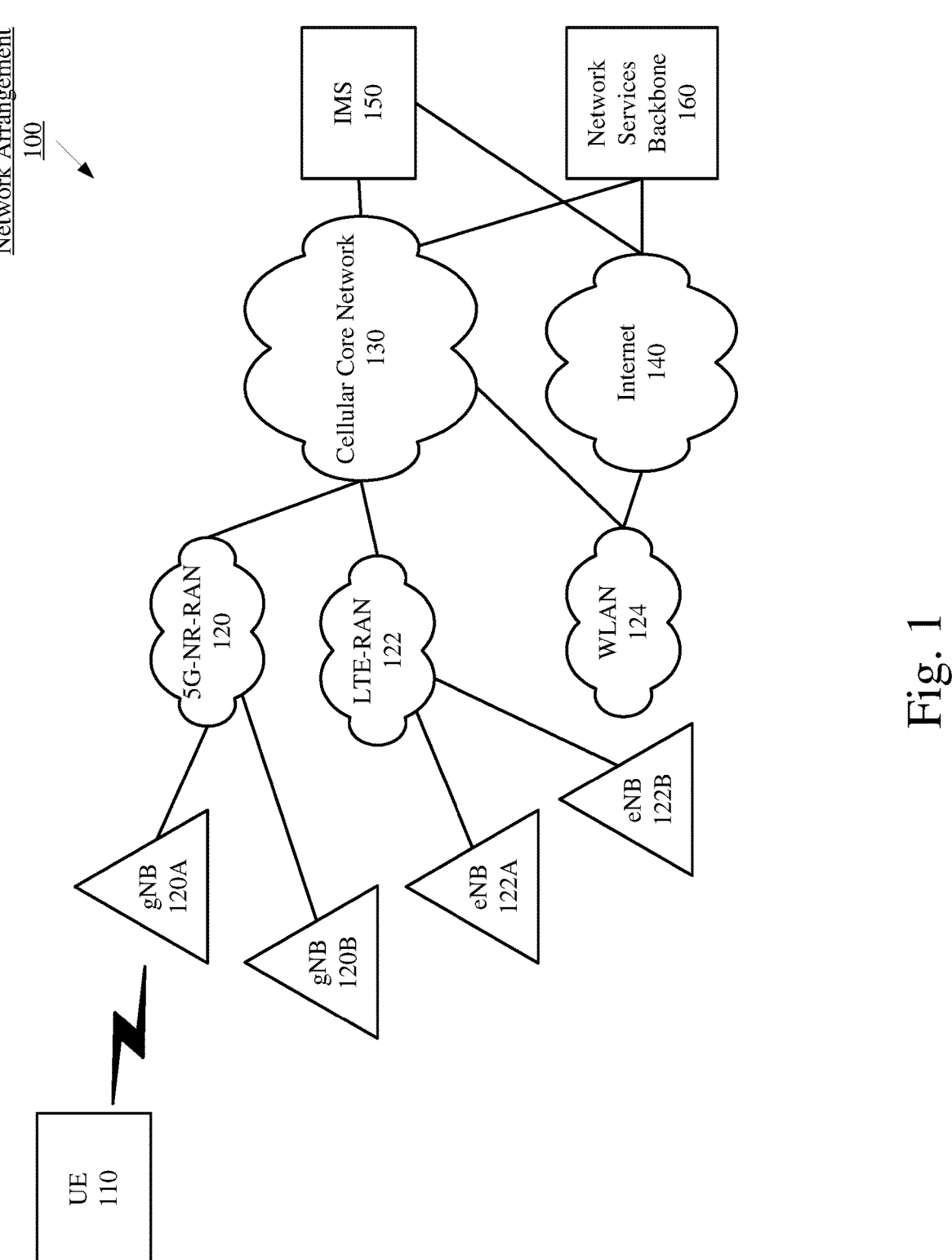
FIG. 1 shows a network arrangement according to various exemplary embodiments.

The exemplary aspects may be further understood with reference to the following description and the related appended drawings, wherein like elements are provided with the same reference numerals. The exemplary aspects describe operations for minimizing an amount of padding transmitted by a user equipment (UE) in an uplink (UL) transmission. According to some embodiments, a UL transmission on one or more radio links may be blanked under various conditions, e.g., when the amount of padding that would be transmitted exceeds a predetermined threshold. According to other embodiments, a smart buffer includes non-time-sensitive data that is opportunistically transmitted on occasions when padding would otherwise be transmitted. According to still further embodiments, buffer status reporting (BSR) is triggered intelligently by the UE in anticipation of a predicted grant size to be provided by the network.

The exemplary aspects are described with regard to a UE. However, the use of a UE is provided for illustrative purposes. The exemplary aspects may be utilized with any electronic component that may establish a connection with a network and is configured with the hardware, software, and/or firmware to exchange information and data with the network. Therefore, the UE as described herein is used to represent any electronic component that is capable of performing UL transmissions with one or more networks.

The exemplary embodiments are also described with regard to a network that includes a 5G new radio (NR) radio access technology (RAT) and a Long-Term Evolution (LTE) RAT. The network may support standalone carrier aggregation (CA) on LTE, CA on NR (NR-CA), or a variety of dual-connectivity (DC) functionalities in which a plurality of component carriers (CCs) are combined across LTE and NR. Each CC may represent a channel that facilitates communication between the UE and the network over a particular frequency band. A plurality of CCs may correspond to the same frequency band, each CC may correspond to a different band, or a combination of CCs across the same frequency band and different frequency bands may be used. Further, each CC has a particular bandwidth, and the more CCs the UE is configured with the more bandwidth that is available for communications with the network.

The UE may be configured to access 5G NR services when operating in non-standalone (NSA) mode for 5G or standalone (SA) mode for 5G. In NSA mode, the UE may establish a connection with both 5G NR RAT and LTE RAT using Dual Connectivity (DC). Throughout this description, DC may generally refer to a UE that is configured to transmit and receive on a plurality of CCs corresponding to cells associated with different RATS. For example, when in NSA mode for 5G, the UE may achieve DC via a master cell group (MCG) corresponding to LTE and a secondary cell group (SCG) corresponding to 5G NR, e.g., E-UTRA NR Dual Connectivity with E-UTRA connected to EPC (EN-DC) or vice versa, where the MCG corresponds to NR and the SCG corresponds to LTE, e.g., NR E-UTRA Dual Connectivity (NE-DC). Other DC functionalities include E-UTRA NR Dual Connectivity with E-UTRA connected to 5GC (NGEN-DC) and NR-NR Dual Connectivity (NR-DC). Each cell group may include at least one cell for a corresponding RAT.

In one exemplary scenario of DC, from a protocol stack perspective, the UE may have a control plane and a user plane with the 5G NR network while also having a control plane and a user plane with the LTE network. In another exemplary scenario of DC, the UE may have a control plane with the LTE network and a user plane with the 5G NR network or vice versa. Thus, when operating in NSA mode for 5G, the UE may have simultaneous connections to 5G NR and LTE. However, it should be noted, that when operating in NSA mode for 5G, the UE may transition between instances of being connected on one RAT (e.g., 5G NR, LTE, Legacy, etc.) to being connected on a multiple RATS (e.g., DC).

The following examples provide a general overview of the type of network configuration that may facilitate DC functionality. In a first exemplary configuration, the network connection may use the evolved packet core (EPC) of LTE and the UE may communicate with at least one LTE cell serving as the master cell group (MCG) and at least one NR cell serving as a secondary cell group (SCG). In a second exemplary configuration, the network connection may use the 5G core network (5GC) and the UE may communicate with at least one NR cell serving as the MCG and at least one LTE cell serving as the SCG. In a third exemplary NSA configuration, the network connection may use the 5GC and the UE may communicate with at least one LTE cell serving as the MCG and at least one NR cell serving as the SCG. However, the exemplary embodiments are not limited to the examples provided above related to either the protocol stack or the network configuration. The exemplary embodiments apply to DC functionality being achieved in any appropriate manner.

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g., legacy cellular networks) and the UE 110 may also communicate with networks over a wired connection. With regard to the exemplary aspects, the UE 110 may establish a connection with the 5G NR-RAN 120 and the LTE-RAN 122 in a NSA or DC mode of operation.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via at least one of the next generation nodeB (gNB) 120A and/or the gNB 120B. Reference to two gNBs 120A, 120B is merely for illustrative purposes. The exemplary aspects may apply to any appropriate number of gNBs. The UE 110 may additionally connect to the LTE-RAN 122 via at least one of the enhanced nodeB (eNB) 122A and/or the eNB 122B. Reference to two eNBs 122A, 122B is merely for illustrative purposes. The exemplary aspects may apply to any appropriate number of eNBs.

In addition to the networks 120, 122 and 124 the network arrangement 100 also includes a cellular core network 130, the Internet 140, an IP Multimedia Subsystem (IMS) 150, and a network services backbone 160. The cellular core network 130, e.g., the 5GC for the 5G NR network, may be considered to be the interconnected set of components that manages the operation and traffic of the cellular network. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
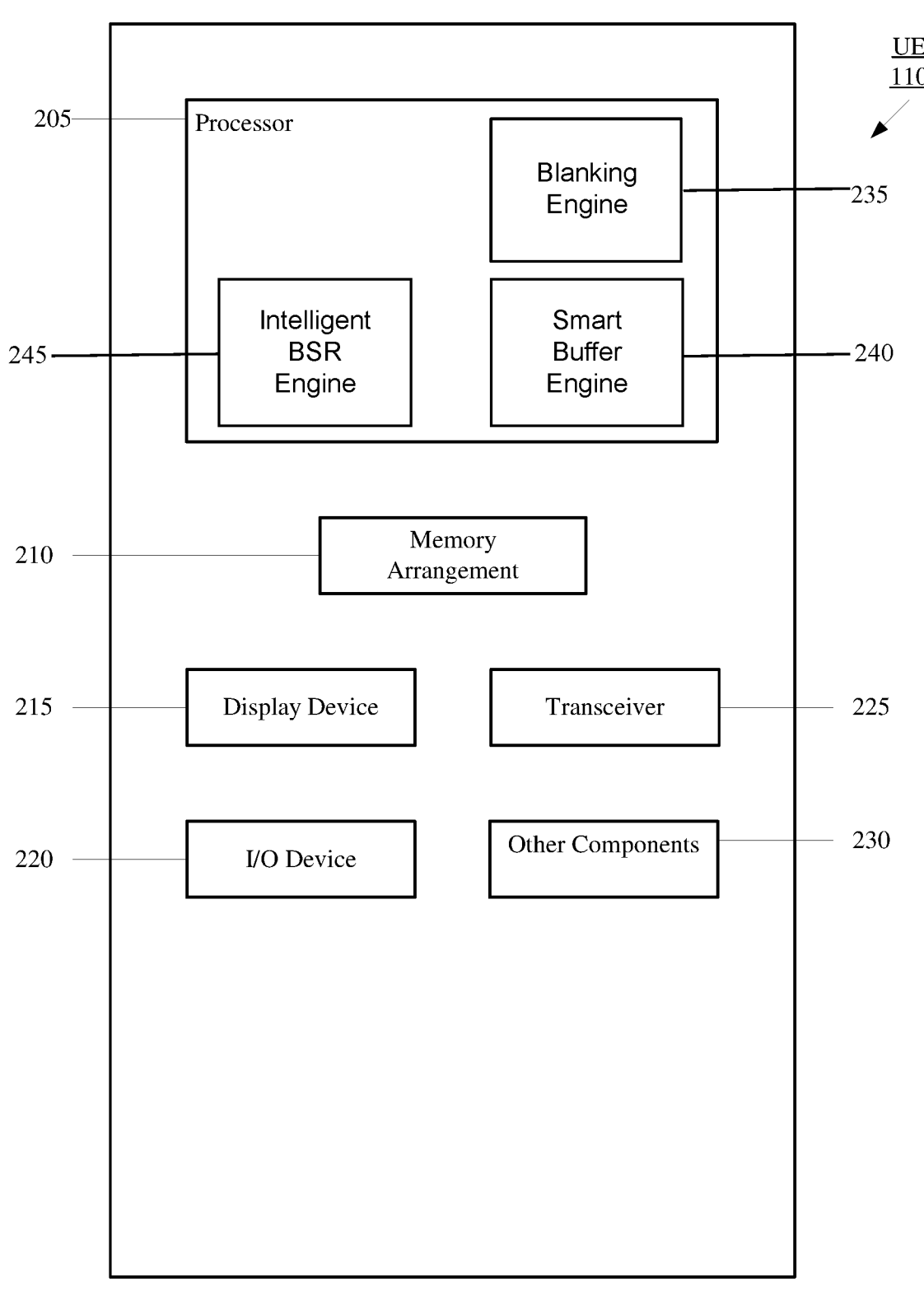
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. Additionally, the UE 110 may be configured to access an SNPN.

The processor 205 may be configured to execute a plurality of engines for the UE 110. For example, the engines may include a blanking engine 235 for performing operations related to determining whether a UL grant should be blanked, e.g., where no UL transmission is performed on the scheduled UL grant. The engines may further include a smart buffer engine 240 for performing operations related to filling a smart buffer with non-time-sensitive UL data and determining whether these data should be used to fill a UL grant that would otherwise include padding. The engines may further include an intelligent BSR engine 245 for performing operations related to anticipating a UL grant to be provided by the network and triggering BSR only when a data buffer is filled to a predetermined degree or a maximum latency for the data in the buffer is reached. These operations will be described in greater detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary aspects may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
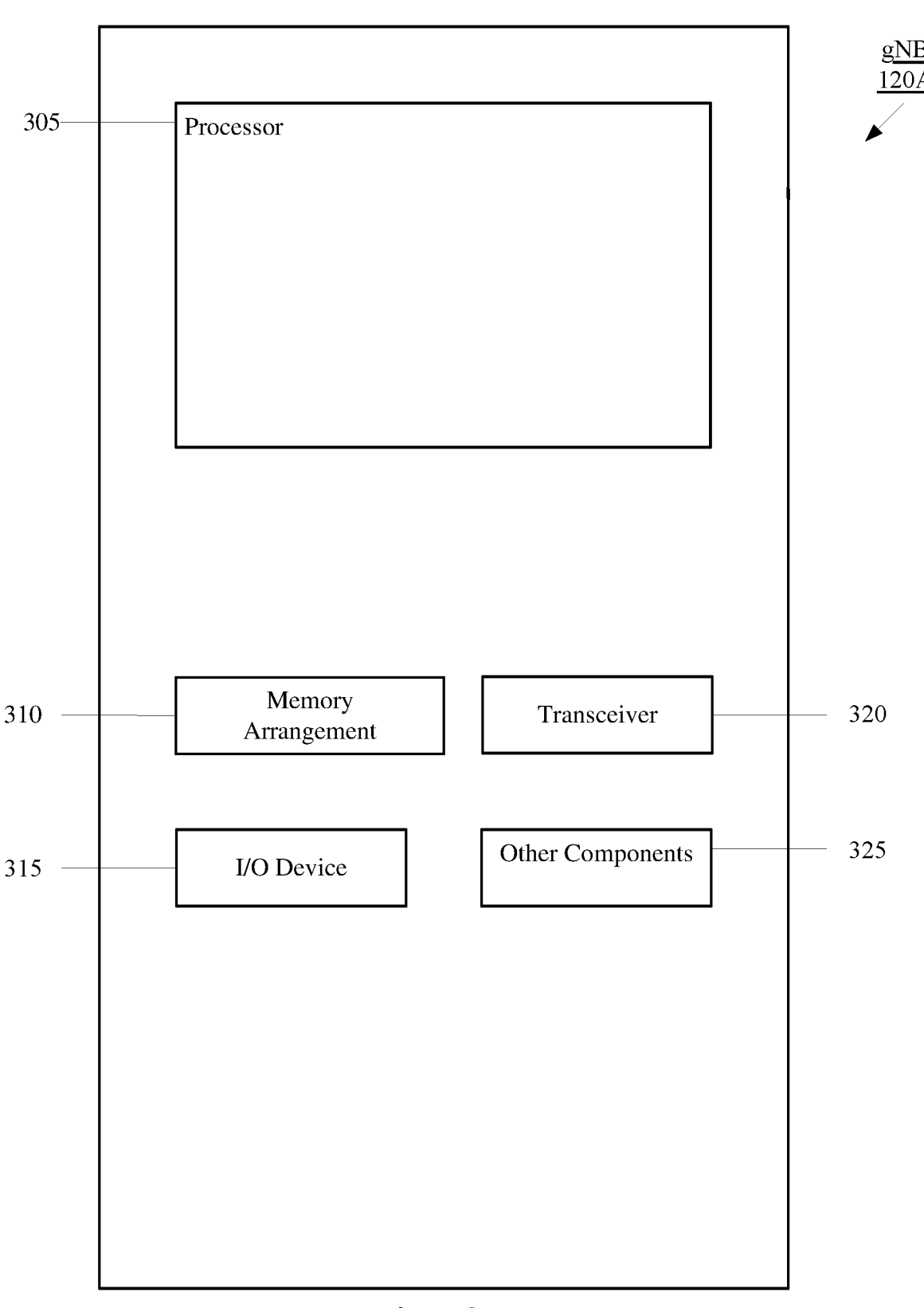
FIG. 3 shows an exemplary network base station according to various exemplary embodiments.

FIG. 3 shows an exemplary network base station, in this case gNB 120A, according to various exemplary embodiments. As noted above with regard to the UE 110, the gNB 120A may represent a serving cell for the UE 110. The gNB 120A may represent any access node of the 5G NR network through which the UE 110 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to perform operations for the gNB including receiving buffer status reporting (BSR) indications from a user equipment and scheduling UL grants for UE transmissions. The functionality of the gNB may be implemented via one or more applications, may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Tx Padding Efficiency Improvement

Currently, many NR networks are deployed using a Non-Standalone (NSA) option combining a Primary Radio Link on LTE with a Secondary Radio Link on NR. Another deployment is a NR Dual Connectivity (DC) option combining a Primary NR Radio link and a Secondary NR Radio link. During DC operation, user traffic is split in the packet data convergence protocol (PDCP) layer. The UE maintains a PDCP entity for the split bearer, which is associated with two or more radio link control (RLC) and medium access control (MAC) entities. In the PDCP configuration, the UE may be configured with a parameter moreThanOneRLC that indicates multiple RLC entities are associated with the PDCP entity. The UE may further be configured with a parameter moreThanTwoRLC that indicates three or more RLC entities are associated with the PDCP entity. Each of the RLC entities are associated to a respective cell group, e.g., a master cell group and one or more secondary cell groups, wherein UL transmissions via the master cell group go to a master cell (e.g., a master gNB or eNB), while UL transmission via the secondary cell group(s) go to secondary cells (e.g., secondary gNBs or eNBs). The master cell and secondary cell(s) maintain RLC and MAC entities associated with the single split bearer.

In split bearer operation, the UE may transmit via either one or multiple of the master cell and the secondary cell(s). Two parameters may be configured for the UE that dictate the transmit path, e.g., a split threshold (parameter ul-data-split-threshold) and a prioritized cell group (parameter primaryPath). When the uplink data volume in the UL buffer is less than the split threshold, the UE transmits the data on the radio link associated with the prioritized cell group (either a primary link or a secondary link). When the data volume in the buffer is equal to or larger than ul-data-split-threshold, the UE can submit the UL data for transmission on both the primary and secondary links. Transmission of UL data also includes Buffer Status Reporting (BSR) that is used to inform the network about the amount of data pending in the UE for UL transfer. The BSR comprises a buffer size bit field indicating an index to a range of buffer sizes.

Based on the BSR, the network(s) predicts the UE behavior and estimates the required UL grant sizes. The network tends to provide more grants than required by the UE to empty the UL data buffer. For example, an overriding concern in 5G networks may be low latency, wherein the network adds extra bandwidth to a grant (relative to the bandwidth needed to empty the buffer) in anticipation of additional UL data being generated between the BSR transmission and the subsequent UL transmission. When the payload size of a UL transmission is smaller than the grant, the UE then fills the remaining portion of the grant by adding padding, e.g., dummy bytes for filling the UL grant.

Adding a significant amount of padding causes the UE to transmit with a high Tx duty cycle, which has multiple drawbacks for the UE, for example power budget inefficiency (unnecessary power consumption) and increased RF exposure, wherein the UE may reach/exceed RF exposure limits take actions such as reducing transmit power or future transmit duty cycles. Reduced Tx power leads to reduced UL coverage and may impact user experience once relevant UL data needs to be transferred.

The network may expect the UL transmission (including padding) from the UE as part of radio link monitoring (RLM) and may trigger radio link failure (RLF) if the UE is not transmitting, even when the UE does not have any application data on the buffer to transmit. The performance impact is more profound during downlink-heavy scenarios, where most of the UL grants received from the network are not required by the UE and padded data is sent to fill the grant.

It is left to UE implementation for the UE PDCP to decide where to request for grants (MCG or SCG) once the buffer exceeds the threshold. As an example, the UE may be camped onto LTE B2 on the primary MCG and have SCGs configured with n5 and n260 bands. As a part of RRC Configuration, the UE may be configured with morethan2rlc, and ul-Data-split-threshold may be defined with bytes configured to be initially sent on the primary uplink. Here, the network could send additional unnecessary grants on all three links. Since UL behavior is mostly dictated by UE choice of sending BSR on multiple links across LTE and NR, the network providing of grants could be inefficient leading to Tx backoff from the UE side and a waste of resources from the NW side.

According to various exemplary embodiments described herein, solutions are proposed for saving power and/or using UL grants for transmitting useful data instead of transmitting padding. As described in further detail below, some exemplary embodiments comprise Tx blanking, where the UE dynamically evaluates and identifies whether a UL grant is necessary to be transmitted or can be blanked. Other exemplary embodiments comprise a smart data buffer, where the UE maintains a smart buffer of time-insensitive data, such as cloud backup, diagnostic information, etc., for transmission at a time when the UE receives UL grants in excess of those needed to empty the typical UL buffer. This data may be queued in the buffer to identify any opportunistic high-padding grants to be sent instead of transmitting padded data. Still further exemplary embodiments comprise intelligent triggering of BSR, where the UE evaluates the current UL grant behavior by the network for a certain period of time and predicts future grant size allocations. Based on this prediction, the UE may trigger BSR when the UL data buffer approaches the predicted value. In this way, the UE will receive a grant only when the UL data buffer size matches a certain level of the predicted grant size and therefore avoids a high amount of padding.

According to some exemplary embodiments, the UE dynamically evaluates whether a UL grant should be transmitted or whether the UL grant should be blanked. This dynamic evaluation may be performed in consideration of the following key parameters. First, the UE may evaluate the padding percentage of the current grant. The padding percentage may be defined as the ratio of the padding bytes to the total grant size. For example, if the grant size is 600 bytes and the UE has a buffer of just 5 bytes to be transmitted, the padding percentage will be approximately 99%. The UE will evaluate whether the padding percentage exceeds a predetermined threshold. The predetermined threshold may be configured in any number of manners, e.g., by the carrier network via RRC signaling (or other types of signaling), defined by standard, hardcoded into the UE by a manufacturer, etc. In addition, it should be understood that the predetermined threshold may be the same or different for different uplink radio links. For example, in FIG. 4, each predetermined threshold is shown as the same X % for all radio links (e.g., in 425, 435, 460 and 475). However, the predetermined threshold may be different for different uplink radio links, e.g., the primary uplink radio link may have a predetermined threshold of X %, a first secondary uplink radio link may have a predetermined threshold of Y %, a second secondary uplink radio link may have a predetermined threshold of Z %, etc.

Second, when the padding percentage exceeds the predetermined threshold, the UE identifies whether the grant is scheduled to carry any Channel State Information (CSI) related parameters for link maintenance. This evaluation is performed because transmission of CSI related parameters may supersede the Tx blanking operation, e.g., CSI transmissions have priority over Tx blanking operations. Third, when the padding percentage exceeds the threshold, and no CSI-related parameters are to be transmitted, the UE may decide to not transmit on this grant occasion on this particular link and save on Tx power.

When a secondary cell link is blanked, the UE will try to accommodate as much UL data on the primary link grants as possible so as to reduce any performance impact on data rates. This performance impact is typically negligible, as the conditions which lead to the high padding percentage on the secondary links are typically a DL-heavy or bursty traffic scenario where the UL traffic created by the UE is generally modest. The remainder of any data which could not be sent in the primary UL grants will be accumulated and sent in subsequent UL grants.

Figure 4:
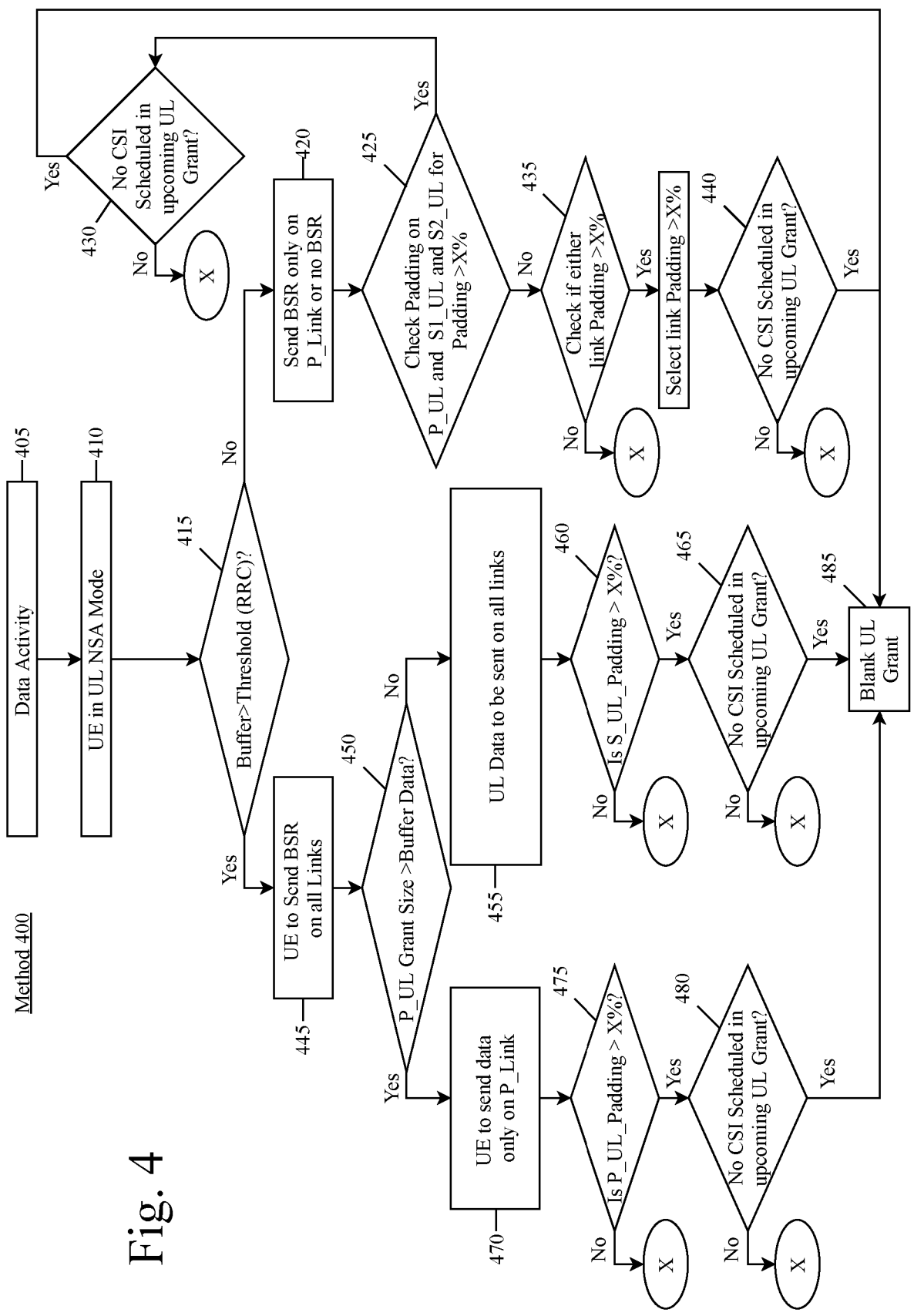
FIG. 4 shows an exemplary method for determining whether an uplink (UL) grant should be used for a UL transmission or should be blanked according to various exemplary embodiments.

FIG. 4 shows an exemplary method 400 for determining whether an uplink (UL) grant should be used for a UL transmission or should be blanked according to various exemplary embodiments. In the method 400, it may be considered that the UE receives some application data for UL transmission (405) and is in a UL NSA mode (410). In 415, the UE evaluates whether the UL data buffer is greater than the configured split threshold. As discussed above, the split threshold is used to determine whether BSR is to be sent on both the primary and secondary radio links. The split threshold may be defined by standards or may be implementation specific, e.g., based on the network provider, specific to the UE, etc.

When the buffer is less than the split threshold, the UE sends a BSR only on the primary link, or not at all (420). In 425, the UE checks the padding percentage for the total grant of the configured links. In this example a primary UL grant, a first secondary UL grant, and a second secondary UL grant are configured. As discussed above, even when the UE does not send a BSR on a given link, the UE may receive a grant on this link. Thus, in this example, it may be considered that grants may be received on all three links.

When the total padding percentage for all the UL grants is greater than the predetermined threshold, in 430, the UE evaluates whether any CSI is scheduled in the upcoming UL grant. As described above, transmission of CSI parameters may supersede the Tx blanking operations. If no CSI is scheduled, then the UE, in 485, blanks the upcoming grant, e.g., the UE will not transmit any UL data on any of the links for which the UE received UL grants. If CSI is scheduled, then the UE does not blank the upcoming grant and transmits the data in the UL buffer as it would during normal operation. In the method 400, this normal operation of transmitting UL data on the grants is denoted as an X in an oval. Thus, in each case where there is no blanking for a particular link, the method 400 proceeds to an oval denoted with the X.

Returning to 425, when the padding percentage for the total grant is not greater than the threshold, the UE checks the padding percentage for each of the individual grants (435). If none of the padding percentages exceed the threshold, then none of the UL transmissions are blanked and the UE transmits UL data based on the UL grants. If any one of the padding percentages exceed the threshold, then each link is separately evaluated to determine whether CSI is scheduled for the link (440). When CSI is scheduled for the link, the UL transmission is not blanked. When CSI is not scheduled for the link, the UL transmission is blanked (485). In the method 400, the blanking operation 485 may be for all the links (e.g., when the blanking operation is determined from operation 430) or for one or more individual links (e.g., when the blanking operation is determined from operation 440).

As described above, when a UL transmission on one of the links is blanked, but other UL transmissions are performed, the UL data that is intended to be transmitted in the blanked UL grant may be shifted to the UL transmissions that are performed. To provide a specific example, it may be considered that in 435 and 440, the two secondary links should be blanked but the Tx for the UL grant for the primary link is performed in the normal manner. The UL grant for the primary link may have a certain amount of padding and this padding may be filled with the UL data from one or more of the secondary links. If there is more data in the UL buffer than the primary link can accommodate for this particular UL grant, some of the data may be retained in the UL buffer for transmission during subsequent grants.

Returning to 415, when the UL data buffer exceeds the split threshold, the UE sends BSR on all configured radio links (445). Again, in this example, there are three (3) links, a primary link and two secondary links. However, those skilled in the art will understand that there may be any number of secondary links. In 450, the UE evaluates whether the primary uplink grant size is greater than the size of the data buffer. When the primary UL grant size is less than the volume of the UL data buffer, UL data is to be sent on all configured radio links (455). However, the grants on all links (particularly the secondary links) may not be fully utilized.

In 460, the UE checks whether the padding percentage on the secondary links exceeds the predetermined threshold. If not, the UE does not blank the UL grant on the secondary link. If the padding percentage exceeds the predetermined threshold, the UE checks whether any CSI is scheduled in the grant (465). If CSI is scheduled, the UE does not blank the UL grant on the secondary link. If CSI is not scheduled, the UE blanks the UL grant on the secondary link (485).

Returning to 450, when the primary UL grant size is greater than the volume of the UL data buffer, the UE may send data only on the primary link (470). In 475, the UE checks whether the padding percentage on the primary link exceeds the predetermined threshold. If not, the UE does not blank the UL grant on the primary link. If the padding percentage exceeds the threshold, in 480, the UE checks whether CSI is to be transmitted on the primary link the upcoming UL grant. If CSI is to be transmitted, then the UE does not blank the primary UL grant. If CSI is not to be transmitted, then the UE blanks the primary UL grant (485).

According to other exemplary embodiments, a smart data buffer comprising time-insensitive (non-time-sensitive) data is maintained. This smart data buffer may be implemented on its own or in combination with the blanking as described above. For example, multiple applications and processes in a UE may create data to be sent to a cloud server. Further, many applications transfer usage statistics which are accumulated over days. This data traffic is not time-critical to transmit, and thus can be transferred to the network at an arbitrary time. According to these exemplary embodiments, this data traffic may be queued and accumulated in a smart buffer for later transmission.

As discussed above, in an NSA mode or NR-DC mode the UE may experience a higher number of UL grants during DL heavy or bursty traffic scenarios where little or no UL data is to be transmitted. When the UE is not in a power-limited scenario, the UE can utilize these excess grants to transmit the data queued in the smart buffer to avoid adding padding to the UL transmission.

This feature may be referred to as "Smart Buffer Data Refresh," and may be enabled and disabled by the user. Queuing the data in the smart buffer and transmitting the data replacing padding may be done by the UE when the user has turned the feature "Smart Buffer Data Refresh" to ON.

An intelligent algorithm may identify the total bytes to be transmitted, such that it minimizes the amount of padding by filling up the grants as much as possible. If the amount of Smart Buffer data is smaller than the excess grant size of the Primary Link or smaller than the excess grant size of the one or more Secondary Link(s), then the UE may send this data on the best Tx link and blank the Tx on the other links. The "best" Tx link may be determined in any of a variety of manners. In one example, the best link may be considered to be the most "power efficient" link as determined by the UE, e.g., the link that has the lowest transmit power requirement. However, other manners of determining the best link may be based on other parameters for the links. If the Smart Buffer data size exceeds the excess grant sizes of the primary link, the UE can utilize the grants in both the primary and secondary links to transfer the information.

Figure 5:
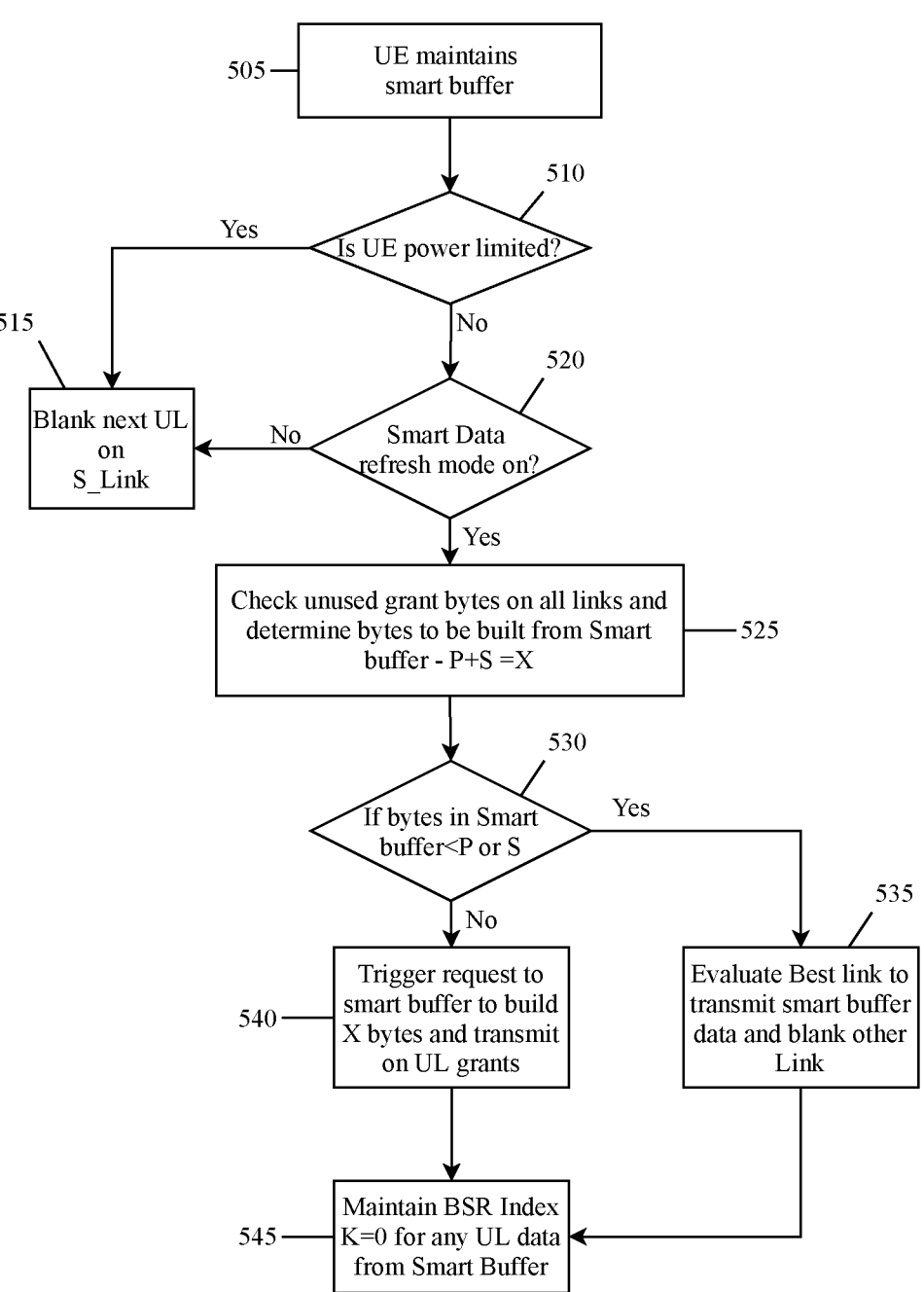
FIG. 5 shows an exemplary method for transmitting smart buffer data on one or more UL grants according to various exemplary embodiments.

FIG. 5 shows an exemplary method 500 for transmitting smart buffer data on one or more UL grants according to various exemplary embodiments. The method 500 will be described with reference to the smart buffer being implemented in combination with the UL blanking operations as described above. Thus, it may be considered that the operation 505 follows the blanking determination 485 of FIG. 4 or any of the UL transmissions that are denoted by the oval with an X in FIG. 4. However, it should be understood that the smart buffer may also be implemented without the blanking operations of method 400. Those skilled in the art will understand the modifications to method 500 to implement the smart buffer without using the blanking operations of method 400.

In 505, the UE maintains the smart buffer that includes non-time-sensitive bytes to be transmitted in opportunistic UL grants. As described above, the smart buffer is populated when certain applications report an amount of non-time-sensitive bytes that have yet to be transferred.

In 510, the UE checks whether the UE is power limited. That is, since the UL data in the smart buffer is not time sensitive, there is no urgency to send the data. Thus, when the UE is power limited, there is no need to waste additional power to transmit UL data that is not time sensitive. If the UE is power-limited, then the UE blanks the upcoming UL grant on secondary links, regardless of the status of the smart buffer (515). This grant time may be used for, for example, UE-specific sensing. Again, in the context of method 500, the blanking is referring to the transmission of the non-time-sensitive UL data because it has already been determined in method 400 that the UL grant is to be blanked for other UL data, e.g., data in the UL buffer that is not in the smart buffer. If the UE is not power-limited, the UE checks whether "smart data refresh mode" is set to ON (520). If the mode is set to OFF, the UE blanks the upcoming UL grant on secondary links, similar to 515, e.g., the smart buffer operation is used when a user sets the smart buffer to an active state.

If the mode is set to ON, in 525, the UE checks the grant bytes to determine the unused portions of the grants and further determines a number of bytes contained in the smart buffer. In 530, the UE checks whether the number of bytes in the smart buffer is less than the unused grant bytes on each of the primary or secondary links, e.g., will the smart buffer UL data fit in the padding of any of the UL grants. If the number of bytes in the smart buffer is less than the unused grant bytes for more than one of the links, the UE, in 535, evaluates a best link to transmit the smart buffer data and blanks the other links. If the bytes in the smart buffer are greater than the unused grant bytes for both of the links, in 540, the UE requests the smart buffer to build the smart buffer bytes and transmit on both links. A BSR index K=0 may be maintained for any UL data from the smart buffer (545).

According to still further exemplary embodiments, the UE performs intelligent BSR triggering so that a BSR is sent only when the data in the buffer is close to a predicted grant size or when the stored data has reached a maximum allowable latency for transmission.

In these exemplary embodiments, the UE identifies the applications that are triggering UL data. These applications may be categorized based on their latency sensitivity. This is done by identifying the latency the application can accommodate without causing a bad user experience. The maximum latency is noted as Y(ms) and may be stored for each of the applications.

Additionally, the UE may learn the network scheduling behavior over all its uplink paths. This can lead to a prediction of UL grants sizes. This prediction is performed every time the UE enters the RRC Connected state, and the data behavior is studied to ensure network loading conditions are taken into consideration. The UE monitors the grants and calculates the average grant size A for a given duration, e.g., 100 ms.

Based on the above data, the UE may intelligently trigger BSR over its links when it is close to filling up the predicted grant. In this way, the UE can avoid transmitting very small bursty UL data. With this grant size prediction, the UE will choose to store UL data in an intermediate buffer until it reaches timer Y(ms) that reflects the maximum allowed latency. This timer Y is identified for all applicable applications. For example, if the timer duration for iMessage is 100 ms, then the UE will accumulate the data in the UL buffer for 100 ms before triggering the BSR. At the same time, if the buffer size reaches X % of the average grant size A before 100 ms duration expires, UE will trigger the BSR as the grant will be sufficiently filled with useful data. The above operations may further employ machine-learning methods to predict network behavior.

FIG. 6 shows a flowchart for an exemplary method 600 for intelligent triggering of BSR. In 605, the UE monitors the UL grant sizes provided by the network over some predetermined time span, e.g., 100 ms, and determines the average grant size over for duration. In 610, the UE receives application data and determines the latency sensitivity of the application data. If the application data is latency-sensitive, then the UE exits the intelligent triggering method and transmits BSR according to existing methods.

If the application data is not latency-sensitive, then the UE holds the incoming UL application data in an intermediate buffer until a predetermined percentage of the average grant size is filled in the buffer (615). In 620, the UE determines that the predetermined percentage of the average grant size is met in the buffer.

In 625, the UE identifies the latency timer for the particular application. The latency timer Y (ms) may be predicted as the maximum latency for transmitting UL data without significantly affecting the user experience. In 630, the BSR is sent for the number of bytes buffered in the Y ms.

Those skilled in the art will understand that the above-described exemplary aspects may be implemented in any suitable software or hardware configuration or combination thereof. An exemplary hardware platform for implementing the exemplary aspects may include, for example, an Intel x86 based platform with compatible operating system, a Windows OS, a Mac platform and MAC OS, a mobile device having an operating system such as iOS, Android, etc. In a further example, the exemplary aspects of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:

receiving an uplink (UL) grant comprising a UL grant size;

determining a current UL buffer size;

comparing the current UL buffer size to the UL grant size
and determining an amount of padding to fill the UL
grant;

determining whether to transmit on the UL grant based on
the amount of padding to fill the UL grant;

determining whether the UL grant is scheduled to carry
channel state information (CSI), wherein determining
whether to transmit on the UL grant is further based on
whether the UL grant is scheduled to carry the CSI; and when the UL grant is not scheduled to carry the CSI, and
the amount of padding relative to the UL grant size
exceeds a predetermined value, determining to blank
the UL grant.

2. The processor of claim 1, wherein the operations
further comprise:

blanking the UL grant when it is determined to not
transmit on the UL grant.

3. The processor of claim 1, wherein the predetermined
value for a primary UL grant and one or more secondary UL
grants is a same predetermined value or different predetermined values.

4. The processor of claim 1, wherein the amount of
padding is based on i) padding for each of a primary UL
grant and one or more secondary UL grants or ii) only
padding for the primary UL grant.

5. The processor of claim 1, wherein the UL grant is for
a secondary radio link in a non-standalone (NSA) or dual-connectivity (DC) mode of operation.

6. The processor of claim 5, wherein the operations
further comprise:

transmitting, on a primary radio link, when the UL grant
for the secondary radio link is blanked, UL data originally scheduled for transmission on the secondary radio
link.

7. The processor of claim 1, wherein the UE is configured
for split bearer operation, the operations further comprising:

comparing the current UL buffer size to a split threshold.

8. The processor of claim 7, wherein, when the UL grant
size exceeds the split threshold and it is determined to
transmit on the UL grant, the transmission is sent on a
primary radio link and one or more secondary radio links of
a split bearer.

9. The processor of claim 7, wherein, when the UL grant
size does not exceed the split threshold and it is determined
to transmit on the UL grant, the transmission is sent (i) only
on a primary radio link of a split bearer when a UL buffer
size for the primary radio link does not exceed the UL grant
size or (ii) on the primary radio link and one or more
secondary radio links when the UL buffer size for the
primary radio link exceeds the UL grant size.

10. A processor of a user equipment (UE) configured to
perform operations comprising:

adding first uplink (UL) data to a first buffer when the first
UL data is determined to be non-time-sensitive;

receiving an UL grant comprising a UL grant size;

determining an excess amount of the UL grant relative to
second UL data to be transmitted;

filling some or all of the excess UL grant with the first UL
data;

performing a UL transmission comprising the first UL
data and the second UL data;

receiving a further UL grant comprising a further UL
grant size, wherein the UL grant corresponds to a
primary radio link and the further UL grant corresponds
to a secondary radio link;

determining a further excess amount of the further UL
grant relative to further second UL data to be transmitted; and when the first UL data has a smaller size than both the
excess amount of the UL grant and the further excess
amount of the further UL grant, determining to add the
first UL data to either the UL grant or the further UL
grant.

11. The processor of claim 10, wherein the first UL data
is determined to be added to either the UL grant or the
further UL grant based on a power efficiency of the primary
radio link relative to the secondary radio link.

12. The processor of claim 10, wherein the operations
further comprise:

when the first UL data has a larger size than both the
excess amount of the UL grant and the further excess
amount of the further UL grant, determining to add
portions of the first UL data to both the UL grant and
the further UL grant.

13. The processor of claim 10, wherein the operations
further comprise:

maintaining a buffer status report (BSR) index for the first
UL data in the first buffer.

14. The processor of claim 10, wherein the operations
further comprise:

determining the UE is power limited; and blanking the UL grant on secondary radio links.

15. A method, comprising:

at a user equipment:

receiving an uplink (UL) grant comprising a UL grant
size;

determining a current UL buffer size;

comparing the current UL buffer size to the UL grant
size and determining an amount of padding to fill the
UL grant;

determining whether to transmit on the UL grant based
on the amount of padding to fill the UL grant;

determining whether the UL grant is scheduled to carry
channel state information (CSI), wherein determining whether to transmit on the UL grant is further
based on whether the UL grant is scheduled to carry
the CSI; and when the UL grant is not scheduled to carry the CSI,
and the amount of padding relative to the UL grant
size exceeds a predetermined value, determining to
blank the UL grant.

16. The method of claim 15, wherein the operations
further comprise:

blanking the UL grant when it is determined to not
transmit on the UL grant.

17. The method of claim 15, wherein the predetermined
value for a primary UL grant and one or more secondary UL
grants is a same predetermined value or different predetermined values.

18. The method of claim 15, wherein the amount of
padding is based on i) padding for each of a primary UL
grant and one or more secondary UL grants or ii) only
padding for the primary UL grant.

19. The method of claim 15, wherein the UL grant is for
a secondary radio link in a non-standalone (NSA) or dual-connectivity (DC) mode of operation.

20. The method of claim 19, wherein the operations
further comprise:

transmitting, on a primary radio link, when the UL grant
for the secondary radio link is blanked, UL data originally scheduled for transmission on the secondary radio
link.

* * * * *